United States Patent [19]
Tournier

[11] Patent Number: 6,050,554
[45] Date of Patent: Apr. 18, 2000

[54] VIBRATION DAMPING ASSEMBLIES

[75] Inventor: Pascal Tournier, Orvault, France

[73] Assignee: Draftex Industries Limited, Edinburg, United Kingdom

[21] Appl. No.: 08/935,343

[22] Filed: Sep. 22, 1997

[30] Foreign Application Priority Data

Sep. 24, 1996 [GB] United Kingdom .................... 9619923

[51] Int. Cl.[7] ....................................................... F16F 5/00
[52] U.S. Cl. .................. 267/140.11; 267/293; 267/141.6
[58] Field of Search ........................ 267/140.11, 140.13, 267/140.14, 292, 293, 141.6, 140.15, 219, 122, 123; 180/300; 248/550, 638

[56] References Cited

U.S. PATENT DOCUMENTS

| | | | |
|---|---|---|---|
| 4,753,421 | 6/1988 | Makibayashi et al. | 267/140.13 |
| 4,836,512 | 6/1989 | Lun | 267/140.13 |
| 4,852,864 | 8/1989 | Bitchkus et al. | 267/219 |
| 5,000,428 | 3/1991 | Thorn | 267/140.11 |
| 5,062,497 | 11/1991 | Ogata . | |
| 5,127,636 | 7/1992 | Spaltofski . | |
| 5,205,546 | 4/1993 | Schisler et al. | 267/140.13 |

FOREIGN PATENT DOCUMENTS

| | | | |
|---|---|---|---|
| 241353A | 10/1987 | European Pat. Off. | 267/140.13 |
| 0 322 239 | 6/1989 | European Pat. Off. . | |
| 0 688 972 | 12/1995 | European Pat. Off. . | |
| 3340153A | 8/1984 | Germany | 267/140.14 |
| 530627A | 11/1993 | Japan | 267/140.11 |

OTHER PUBLICATIONS

Patent Abstracts of Japan, 010, 372, Dec. 11, 1986 (JP 61 165041 English abstract).

*Primary Examiner*—Christopher P. Schwartz
*Assistant Examiner*—Melanie Talavera
*Attorney, Agent, or Firm*—Leydig, Voit & Mayer, Ltd.

[57] ABSTRACT

An engine mount assembly comprises a rigid dome-shaped cover secured to the vehicle body or chassis. The cover supports internal rubber elements which in turn support rigid facing jaws. A damping module comprising two bellows chambers and an assembly of two valve elements is inserted in a unit, together with a valve arrangement. A bolt secured to the engine of the vehicle passes through the valve elements and holds the damping module in position and transmits engine vibrations to the damping module. Hydraulic fluid in the chambers is thus forced through a helical conduit which contains a restriction for damping the fluid movement and thus the vibrations. At higher vibration frequencies, valve flaps vibrate causing alternate small compression and expansion of the chambers and thus damping of the vibrations.

20 Claims, 2 Drawing Sheets

VIBRATION DAMPING ASSEMBLIES

The invention relates to vibration damping assemblies. Vibration damping assemblies embodying the invention, and to be described below with more detail by way of example, can be used for supporting and damping the vibration of engines in motor vehicles.

According to the invention, there is provided a vibration damping assembly for damping vibrations of a first element with reference to a second element, comprising resilient material; a first rigid member for connection to the first element and attached to the resilient material; a second rigid member for connection to the second element and attached to the resilient material for resilient support thereby relative to the first rigid member; flexible-walled chamber means for receiving hydraulic fluid and mounted in the assembly so that at least some of the said vibrations cause wall-flexing of the flexible-walled chamber means and consequent displacement of the hydraulic fluid; and hydraulic damping means incorporating flow-controlling means for controlling the hydraulic fluid displacement and damping the vibrations, the hydraulic damping means being a unit including receiving means for receiving the second rigid member the second rigid member securing the hydraulic damping unit in the assembly.

According to the invention, there is further provided an engine mount assembly for connection between an engine of a motor vehicle and the body or chassis thereof for damping vibrations of the engine relative to the body or chassis, the assembly comprising: a first rigid member comprising rigid cover means for attachment to the body or chassis and embracing a space; stiff resilient means secured to a surface of the cover means within the space and projecting into the space; and a separate hydraulic damping unit adapted to be insertable as a module into the space; the damping module being attachable to the stiff resilient means and including means for receiving a second rigid member for connection to the engine and supporting it on the stiff resilient means such that vibrations of the engine relative to the body or chassis are partially damped by the resultant flexing of the resilient means, two flexible-walled chambers for receiving hydraulic fluid and positioned when the damping module is inserted such that at least one of them undergoes wall flexing in response to the said vibrations causing consequent displacement of the hydraulic fluid, and flow-controlling means for controlling the hydraulic fluid displacement and damping the vibrations.

Engine mounts embodying the invention will now be described, by way of example only, with reference to the accompanying diagrammatic drawings in which.

Figure 1:
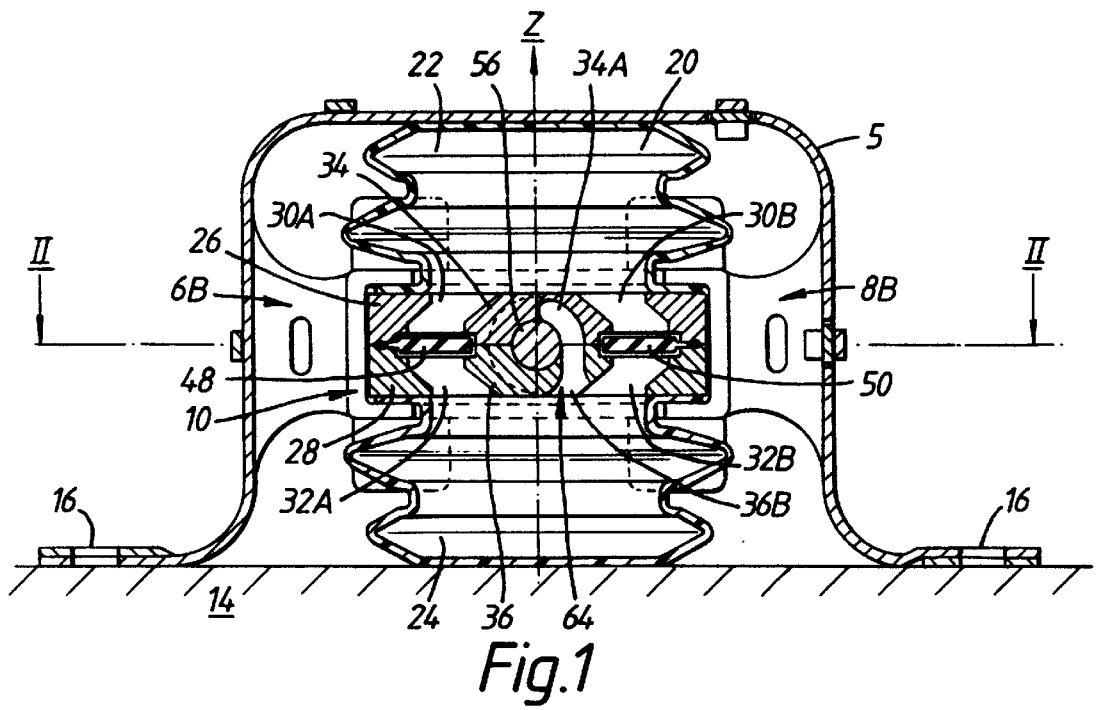
FIG. 1 is a cross-section through one of the engine mounts, taken on the line I—I of FIG. 2.
Figure 2:
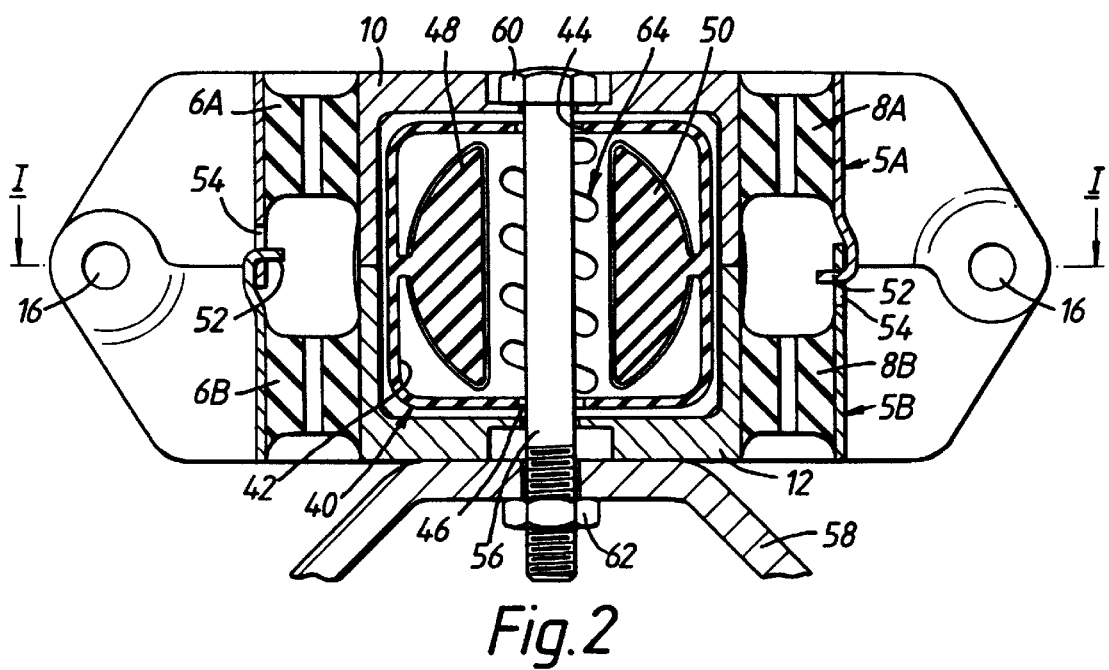
FIG. 2 is a cross-section through the engine mount of FIG. 1, taken on the line II—II of FIG. 1.

Referring firstly to FIG. 1, the engine mount comprises a rigid cover 5 which, as shown in FIG. 2, is in two separate parts 5A and 5B. The cover is made of metal and has rubber elements 6 and 8 attached to it. As shown in FIG. 2, each rubber element is in two parts, 6A and 6B, and 8A and 8B; rubber parts 6A and 8A are attached to cover part 5A and rubber parts 6B and 8B are attached to cover part 5B. The rubber elements 6 and 8 support jaws 10 and 12 which are preferably made of metal. The jaw 10 is attached to rubber parts 6A and 8A and the jaw 12 is attached to the rubber parts 6B and 8B.

The cover 5 is rigidly attached to the chassis or body 14 of the vehicle, such as by means of bolts through holes 16.

The engine mount incorporates a damping module indicated generally at 20. The damping module comprises two moulded chambers 22 and 24, each being in the form of a respective bellows and being preferably moulded from thermoplastic material. In addition, each bellows 22, 24 supports a respective moulded valve element 26, 28 (see FIG. 1). The two valve elements 26, 28 are of identical construction and are brought together in abutment with each other, as shown in FIG. 1, in a manner to be explained in more detail below.

The two moulded valve elements 26, 28 each incorporate two through passageways 30A, 30B and 32A, 32B.

In addition, the damping module 20 incorporates a valve arrangement 40 (FIG. 2). This is a single moulded part and comprises a frame 42 which is square in configuration and defines through holes 44 and 46. The frame 42 integrally supports two valve flaps 48 and 50. The shape of the valve flaps 48 and 50 in FIG. 2 indicates the general cross-sectional shape of the passageways 30A, 32B.

The engine mount is assembled by inserting the damping module 20 between the jaws 10 and 12 so that the two moulded valve elements 26, 28 are brought together in abutment with each other, with the valve arrangement 40 clamped between them, as shown in FIG. 1. The two cover parts 5A, 5B are partially held together by bent-over tangs 52 which are inserted through respective slots 54. A bolt 56 having a head 60 is then inserted through a bore formed by two facing channels in the central parts 34, 36 of the valve elements 26, 28 so as to clamp a rigid support 58 in position. Assembly is completed by means of a nut 62. Rigid support 58 is connected to the engine. The frame 42 provides a seal around the faces of the valve elements 26, 28 where they are brought together.

In operation, vibrations of the engine, generally in the direction of the axis Z, are thus accommodated and partially absorbed by the effects of the rubber elements 6, 8, vibrations of the engine being transmitted to the rubber elements by the jaws 10 and 12.

Additional damping is provided by the damping module 20. Its two chambers 22, 24 are filled with hydraulic fluid and are interconnected by a helically shaped conduit 64 formed by grooves 34A, 36B formed in the two central parts 34, 36 of the valve elements 26, 28. The grooves 34A, 36B respectively communicate with the channels forming the bore through which the bolt 56 passes and together constitute the helical conduit when the bolt 56 is in position. The helical conduit thus encircles the bolt 56 and each of its two ends is open to a respective one of the chambers 22, 24.

Such vibrations of the engine, transmitted to the bolt 56, also of course cause alternate compression and expansion of the chambers 22, 24, thus causing corresponding movement of the hydraulic fluid within them.

At relatively low frequencies of engine vibration, when the amplitude of the vibrations is relatively high, the hydraulic fluid moves between the chambers 22, 24 through the helical conduit 64, the restricted cross-sectional area of this channel and the resonance of the fluid in the channel damping the vibrations. The low frequency relatively high amplitude vibrations are such that the valve flaps 48, 50 effectively prevent communication between the two chambers 22, 24 through the passageways 30A, 32A, 30B, 32B.

At higher frequencies of vibration, above the resonant frequency of the fluid in the helical channel, the fluid is substantially prevented from passing through this channel. Under these circumstances, the valve flaps 48, 50, vibrate and transmit pressure changes between the two chambers 22, 24 via the passageways 30A, 32A, 30B, 32B. The play of each valve flap 48, 50 is selected so that it compensates for variations in volume of the compressed chamber due to vibrations set up by the engine at idling speed, the vibrations being of low amplitude. At higher vibration frequencies when the engine is running at higher speeds, the amplitudes of the vibrations are still small and the play of the valve flaps 48, 50 is sufficient to compensate for the variations in volume of the chambers caused by the vibrations. The pressure in the chambers is thus held low and transmission of engine vibrations to the vehicle body is reduced.

If desired, the passageways 30A, 32A, 30B, 32B can be dimensioned to provide a high resonant frequency for the fluid, thus providing dynamic damping within a desired frequency range.

It will be understood that various modifications can be made.

Thus, the damping module 20 may incorporate only a single valve flap 48 and channels 30A and 32A, the valve 50 not being provided and the channels 30B and 32B being closed off. In a further modification, however, the valve assemblies 26, 28 can be replaced by respective solid blocks incorporating only the grooves 34A and 36B to form the helical conduit 64. Therefore, in the assembled engine mount, the helical conduit provides the only interconnection between the two chambers 22, 24. The helical conduit could be replaced by a simple generally circumferentially shaped channel.

The inner surface of the helical conduit 64 can be formed by the outer surface of the bolt 56 as already described. Instead, it could be formed by the outer surface of a rigid tube through which the bolt 56 is passed.

The two chambers 22, 24 are identical in shape, as are the two valve elements 26, 28. Clearly, this simplifies manufacture because it reduces the number of different moulds required. In addition, the two cover parts 5A and 5B are identical in shape, as are their respective rubber parts 6A, 8A, 6B, 8B.

The whole assembly is held together by the bolt 56 which, of course, also serves to attach the engine mount to the vehicle engine.

In a further modification, the damping module may exclude the chambers 22, 24, these chambers being pre-fitted parts of the assembly.

Figure 3:
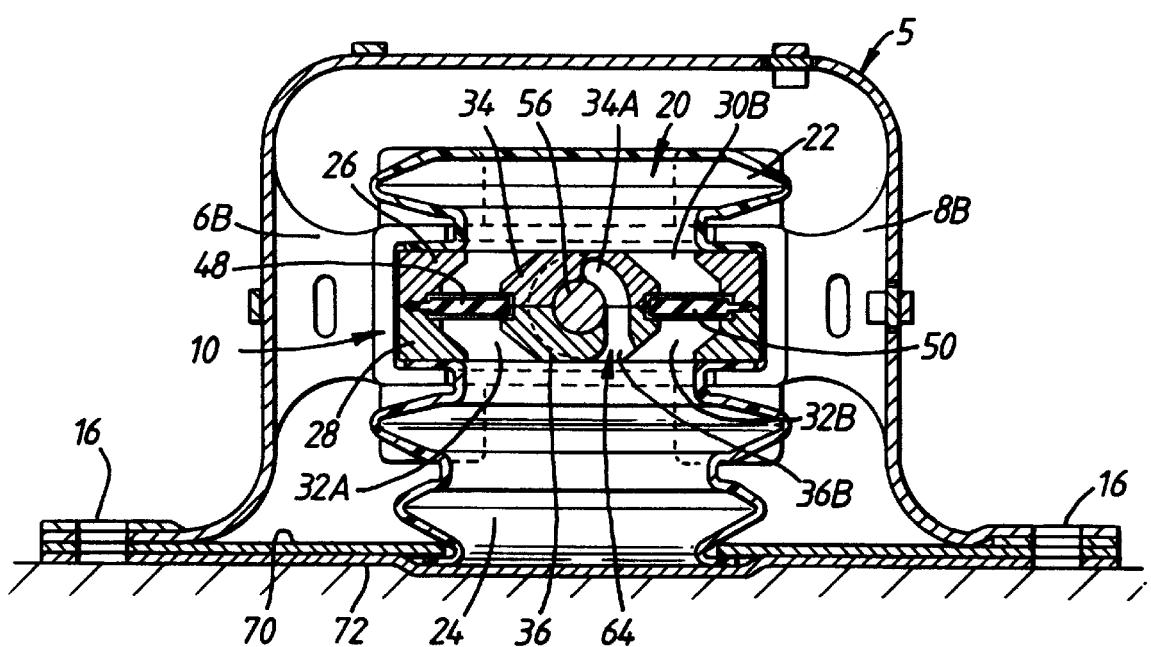
FIG. 3 is a cross-section corresponding to FIG. 1 but showing a modified engine mount.

FIG. 3 shows a modified assembly in which parts corresponding to those in FIGS. 1 and 2 are similarly referenced.

In the assembly of FIG. 3, chamber 22 is not in contact with the rigid cover 5. In addition, chamber 24 has its lower end clamped between plates 70 and 72 attached to the lower face of the rigid cover 5.

In operation, chamber 24 is alternately compressed and expanded in response to vibrations, as before. However, chamber 22 now acts solely as a compensation chamber; because it is not in contact with the under surface of the rigid cover 5 it is not alternately compressed and expanded by the engine vibrations. It simply acts to accommodate changes in fluid pressure caused by the expansion and compression of chamber 24, these pressure changes being transmitted to chamber 22 via the valve flaps 48, 50 and the helical conduit 64 in the manner explained in conjunction with FIGS. 1 and 2.

A disadvantage of the arrangement shown in FIG. 3 is that its construction is more complex, and therefore more expensive, because it is necessary to anchor the lower end of the chamber 24 between the plates 70 and 72 in order to ensure that it properly follows all vibrations of the engine.

What is claimed is:

1. A vibration damping assembly for damping vibrations of a first element with reference to a second element, comprising:

a resilient material;

a first rigid member for connection to the first element and attached to the resilient material;

a second rigid member for connection to the second element and attached to the resilient material for resilient support thereby relative to the first rigid member; and a hydraulic damping means including a flexible-walled chamber means for receiving hydraulic fluid when mounted in the assembly so that at least some of the vibrations cause wall-flexing of the flexible-walled chamber means and consequent displacement of the hydraulic fluid;

the hydraulic damping means incorporating a flow-controlling means for controlling the hydraulic fluid displacement and damping the vibrations;

the hydraulic damping means being insertable into and removable from the assembly as a single module and including a receiving means for receiving the second rigid member;

the second rigid member when received by the hydraulic damping means and when the latter is inserted in the assembly, securing the hydraulic damping means in the assembly;

the flexible-walled chamber means comprising two separate chambers connected by a fluid passage, the fluid passage being formed in the hydraulic damping means and forming part of the flow-controlling means;

one, only, of the two chambers having its flexible wall positioned so that it is flexed by the said vibrations.

2. An assembly according to claim 1, in which the second rigid member is secured to the resilient material, and the receiving means defines a bore, the second rigid member passing through the bore in the receiving means.

3. An assembly according to claim 1, in which the fluid passage is a helical passage.

4. An assembly according to claim 3, in which the fluid passage is defined in material forming the receiving means.

5. A vibration damping assembly for damping vibrations of a first element with reference to a second element, comprising:

a resilient material;

a first rigid member for connection to the first element and attached to the resilient material;

a second rigid member for connection to the second element and attached to the resilient material for resilient support thereby relative to the first rigid member; and a hydraulic damping means including a flexible-walled chamber means for receiving hydraulic fluid when mounted in the assembly so that at least some of the vibrations cause wall-flexing of the flexible-walled chamber means and consequent displacement of the hydraulic fluid;

the hydraulic damping means incorporating a flow-controlling means for controlling the hydraulic fluid displacement and damping the vibrations;

the hydraulic damping means being insertable into and removable from the assembly as a single module and including a receiving means for receiving the second rigid member;

the second rigid member when received by the hydraulic damping means and when the latter is inserted in the assembly, securing the hydraulic damping means in the assembly;

the flexible-walled chamber means comprising two separate chambers connected by a helical fluid passage, the helical fluid passage being defined in material forming the receiving means of the hydraulic damping means, the helical fluid passage forming part of the flow-controlling means;

the material forming the receiving means defining a through bore for receiving the second rigid member, the through bore intersecting with the fluid passage such that an outer surface of the second rigid member when received in the through bore defines part of the wall of the fluid passage.

6. An assembly according to claim 5, in which the second rigid member is secured to the resilient material.

7. An assembly according to claim 5, in which the second rigid member comprises a rigid tube.

8. A vibration damping assembly for damping vibrations of a first element with reference to a second element, comprising:

a resilient material;

a first rigid member for connection to the first element and attached to the resilient material;

a second rigid member for connection to the second element and attached to the resilient material for resilient support thereby relative to the first rigid member; and a hydraulic damping means including a flexible-walled chamber means for receiving hydraulic fluid when mounted in the assembly so that at least some of the vibrations cause wall-flexing of the flexible-walled chamber means and consequent displacement of the hydraulic fluid;

the hydraulic damping means incorporating a flow-controlling means for controlling the hydraulic fluid displacement and damping the vibrations;

the hydraulic damping means being insertable into and removable from the assembly as a single module and including a receiving means for receiving the second rigid member;

the second rigid member when received by the hydraulic damping means and when the latter is inserted in the assembly, securing the hydraulic damping means in the assembly;

the flexible-walled chamber means comprising two separate chambers connected by a helical fluid passage, the helical fluid passage being defined in material forming the receiving means of the hydraulic damping means, the helical fluid passage forming part of the flow-controlling means;

the material forming the receiving means being in the form of two separate complementary parts each associated with a respective one of the chambers and having respective surfaces in contact with each other in the hydraulic damping means, the contacting surfaces defining respective grooves which are matchingly in line with each other when the surfaces contact each other so as together to define part of the wall of the fluid passage.

9. A vibration damping assembly for damping vibrations of a first element with reference to a second element, comprising:

a resilient material;

a first rigid member for connection to the first element and attached to the resilient material;

a second rigid member for connection to the second element and attached to the resilient material for resilient support thereby relative to the first rigid member; and a hydraulic damping means including a flexible-walled chamber means for receiving hydraulic fluid when mounted in the assembly so that at least some of the vibrations cause wall-flexing of the flexible-walled chamber means and consequent displacement of the hydraulic fluid;

the hydraulic damping means incorporating a flow-controlling means for controlling the hydraulic fluid displacement and damping the vibrations;

the hydraulic damping means being insertable into and removable from the assembly as a single module and including a receiving means for receiving the second rigid member;

the second rigid member when received by the hydraulic damping means and when the latter is inserted in the assembly, securing the hydraulic damping means in the assembly;

the flexible-walled chamber means comprising two separate chambers connected by a helical fluid passage, the helical fluid passage being defined in material forming the receiving means of the hydraulic damping means, the helical fluid passage forming part of the flow-controlling means;

the hydraulic damping means defining at least one fluid bypass passageway extending between the two chambers in parallel with the helical fluid passage and incorporating a vibratory valve means for transmitting hydraulic fluid displacement between the two chambers.

10. An assembly according to claim 8, in which the hydraulic damping means defines at least one fluid bypass passageway extending between the two chambers in parallel with the fluid passage and incorporating a vibratory valve means for transmitting hydraulic fluid displacement between the two chambers.

11. An assembly according to claim 10, in which the valve means is integrally moulded with a sealing means for providing a seal between the two contacting surfaces.

12. An assembly according to claim 2, in which the second rigid member is secured to the resilient material through a rigid means fixed to the resilient material.

13. An assembly according to claim 1, in which the first rigid member comprises a rigid cover means for connection to the first element and embracing a space;

the resilient material is secured to a surface of the cover means within the space and projects into the space; and the hydraulic damping means is adapted to be insertable as the module into the space.

14. A vibration damping assembly for damping vibrations of a first element with reference to a second element, comprising:

a resilient material;

a first rigid member for connection to the first element and attached to the resilient material;

a second rigid member for connection to the second element and attached to the resilient material for resilient support thereby relative to the first rigid member;

two flexible-walled chambers for receiving hydraulic fluid and mounted in the assembly so that at least some of the said vibrations cause wall-flexing of the chambers and consequent displacement of the hydraulic fluid;

a hydraulic damping means in which is formed a fluid passageway connecting the two chambers and through which the hydraulic fluid is displaced, the fluid passage forming part of flow-controlling means of the hydraulic damping means for controlling the hydraulic fluid displacement and damping the vibrations;

the hydraulic damping means being a unit including a receiving means formed by a material having a through bore for receiving the second rigid member;

the second rigid member securing the hydraulic damping means in the assembly;

the fluid passage being defined in the material forming the receiving means, the through bore intersecting with the fluid passage such that an outer surface of the second rigid member defines part of the wall of the fluid passage.

15. An assembly according to claim 14, in which the second rigid member is secured to the resilient material.

16. An assembly according to claim 14, in which the second rigid member comprises a rigid tube.

17. A vibration damping assembly for damping vibrations of a first element with reference to a second element, comprising:

a resilient material;

a first rigid member for connection to the first element and attached to the resilient material;

a second rigid member for connection to the second element and attached to the resilient material for resilient support thereby relative to the first rigid member;

two flexible-walled chambers for receiving hydraulic fluid and mounted in the assembly so that at least some of the said vibrations cause wall-flexing of the chambers and consequent displacement of the hydraulic fluid;

a hydraulic damping means in which is formed a fluid passage connecting the two chambers and through which the hydraulic fluid is displaced, the fluid passage forming part of flow-controlling means of the hydraulic damping means for controlling the hydraulic fluid displacement and damping the vibrations;

the hydraulic damping means being a unit including a receiving means formed by a material having a through bore for receiving the second rigid member, the second rigid member securing the hydraulic damping means in the assembly;

the fluid passage being defined in the material forming the receiving means;

the material defining the fluid passage being in the form of two separate complementary parts each associated with a respective one of the chambers and having respective surfaces in contact with each other in the hydraulic damping means, the contacting surfaces defining respective grooves which are matchingly aligned with each other when the surfaces contact each other so as together to define part of the wall of the fluid passage.

18. A vibration damping assembly for damping vibrations of the first element with reference to a second element, comprising:

a resilient material;

a first rigid member for connection to the first element and attached to the resilient material;

a second rigid member for connection to the second element and attached to the resilient material for resilient support thereby relative to the first rigid member;

two flexible-walled chambers for receiving hydraulic fluid and mounted in the assembly so that at least some of the said vibrations cause wall-flexing of the chambers and consequent displacement of the hydraulic fluid;

a hydraulic damping means in which is formed a fluid passage connecting the two chambers and through which the hydraulic fluid is displaced, the fluid passage forming part of flow-controlling means of the hydraulic damping means for controlling the hydraulic fluid displacement and damping the vibrations;

the hydraulic damping means being a unit including a receiving means formed by a material having a through bore for receiving the second rigid member;

the second rigid member securing the hydraulic damping means in the assembly;

the fluid passage being defined in the material forming the receiving means;

the hydraulic damping means defining at least one fluid bypass passageway extending between the two chambers in parallel with the fluid passage and incorporating vibratory valve means for transmitting hydraulic fluid displacement between the two chambers.

19. An assembly according to claim 17, in which the hydraulic damping means defines at least one fluid bypass passageway extending between the two chambers in parallel with the fluid passage and incorporating vibratory valve means for transmitting hydraulic fluid displacement between the two chambers.

20. An assembly according to claim 19, in which the valve means is integrally molded with sealing means providing a seal between the two contacting surfaces.

* * * * *